CRESSMAN, PFLEGER & KEELY.
Water Wheel.

No. 97,888.           Patented Dec. 14, 1869.

United States Patent Office.

GEORGE W. CRESSMAN AND BERT PFLEGER, OF BARREN HILL, AND NICE KEELY, OF ROXBOROUGH, PENNSYLVANIA.

Letters Patent No. 97,888, dated December 14, 1869.

IMPROVEMENT IN WATER-WHEEL.

The Schedule referred to in these Letters Patent and making part of the same.

*To all whom it may concern:*

Be it known that we, GEORGE W. CRESSMAN and BERT PFLEGER, of Barren Hill, in the county of Montgomery, and State of Pennsylvania, and NICE KEELY, of the city of Roxborough, in the county of Philadelphia, and State of Pennsylvania, have invented a new and useful Improvement in Water-Wheels; and we do hereby declare that the following is a full, clear, and exact description thereof, which will enable others skilled in the art to make and use the same, reference being had to the accompanying drawing, forming part of this specification.

This invention relates to improvements in turbine-wheels, designed to provide an arrangement of the gates within the bucket-rim, (the water being received from below, and the wheel being made hollow, for the reception of the water, and to provide space for the said gates,) in a manner calculated to relieve the wheel of pressure from the water, either in an upward or downward direction, all as hereinafter more fully specified.

Similar letters of reference indicate corresponding parts.

We arrange the case A of the wheel with a large opening, B, at the bottom, for the reception of the water to the horizontally-revolving wheel C, having buckets of ordinary construction.

We suspend the bucket-rims C' from the disk C, in a manner to hollow out the wheel within the bucket-rims for the reception of the gates D, and the disk E above them, and on which they are supported at their upper ends in journals E', the lower journals being pivoted in the elevated rim F of the lower part of the case.

In the top of the lower part of the case we make an annular recess for the reception of a ring, G, for actuating the buckets.

The periphery of this ring is located just within the lower journals of the gates, and the upper face is provided with studs H, rising up one on each side of each bucket, so that the rotation of the ring will open and close the gates by swinging them in either direction on their journals.

Figure 1:
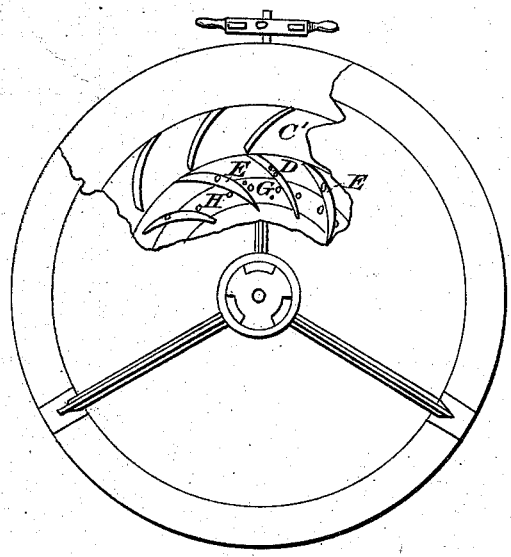
Figure 1 represents a plan view, partly broken, of our improved wheel.
Figure 2:
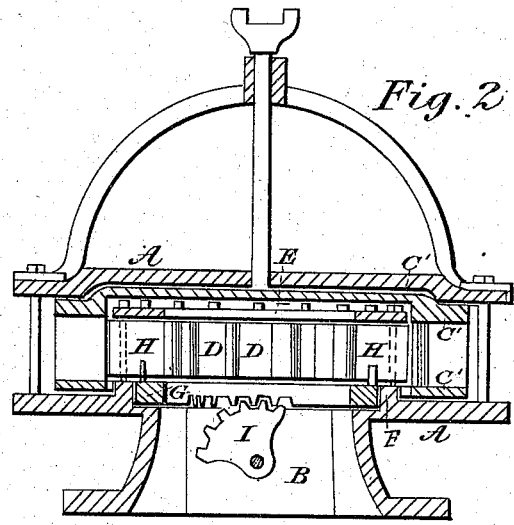
Figure 2 represents a sectional elevation of the same, taken on the line $x$–$x$ of fig. 1.

The said gates are preferably made in the form of a crescent, whereby the points on which the water is received have a radial, or nearly radial direction, from which their concaved surfaces, when in the open condition, gradually change the course of the water to give the most direct impact against the concave faces of the buckets, as clearly shown in fig. 1.

For operating the rim G, a portion of its under surface is toothed, and a toothed segment, I, is supported in a recess in the case, out of the way of the inflowing volume of water, on a short shaft passing through the case in a stuffing-box, and provided with a hand-wheel on the outside.

It will be observed that by this arrangement the wheel is not exposed to vertical pressure from the water in either direction, neither when standing nor running.

Having thus described our invention,

What we claim as new, and desire to secure by Letters Patent, is—

1. The hollow wheel, wheel-case, gates, disk E, and ring G, all combined and arranged substantially as specified.

2. The gates D, ring G, pins H, toothed segment I, and hand-wheel and shaft, all arranged as specified.

GEORGE W. CRESSMAN.
BERT PFLEGER.
NICE KEELY.

Witnesses:
GEO. E. JOHNSON,
WM. P. ALMOND.